(12) United States Patent
Zhou et al.

(10) Patent No.: US 11,431,645 B2
(45) Date of Patent: Aug. 30, 2022

(54) METHOD AND APPARATUS FOR HANDLING NETWORK CONGESTION, AND SYSTEM

(71) Applicant: HUAWEI TECHNOLOGIES CO., LTD., Guangdong (CN)

(72) Inventors: Wei Zhou, Shanghai (CN); Xin Xu, Shanghai (CN); Jianguo Yao, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 124 days.

(21) Appl. No.: 16/709,566

(22) Filed: Dec. 10, 2019

(65) Prior Publication Data

US 2020/0120036 A1    Apr. 16, 2020

Related U.S. Application Data

(63) Continuation of application No. PCT/CN2018/087672, filed on May 21, 2018.

(30) Foreign Application Priority Data

Jun. 20, 2017    (CN) .......................... 201710477756.9

(51) Int. Cl.
*H04L 12/873* (2013.01)
*H04L 47/52* (2022.01)
(Continued)

(52) U.S. Cl.
CPC .............. *H04L 47/52* (2013.01); *H04L 47/12* (2013.01); *H04L 47/56* (2013.01); *H04L 47/621* (2013.01); *H04L 47/781* (2013.01)

(58) Field of Classification Search
CPC ....... H04L 12/56; H04L 47/12; H04L 47/127; H04L 47/52; H04L 47/56; H04L 47/621; H04L 47/781
See application file for complete search history.

(56) References Cited

U.S. PATENT DOCUMENTS

2012/0275438 A1*  11/2012  Dai .................. H04W 72/1289
                                                                370/336
2013/0343191 A1   12/2013  Kim et al.
(Continued)

FOREIGN PATENT DOCUMENTS

CN    1658575 A    8/2005
CN    106789660 A    5/2017

OTHER PUBLICATIONS

Sun Limin, et al. "A Survey of Congestion Control Technology for Wireless Sensor Networks", Journal of Computer Research and Development, vol. 45, No. 1, Dec. 31, 2008, pp. 63-72. With English abstract.

(Continued)

*Primary Examiner* — Jason E Mattis
*Assistant Examiner* — Bao G Nguyen
(74) *Attorney, Agent, or Firm* — Womble Bond Dickinson (US) LLP

(57) ABSTRACT

Embodiments of the present disclosure disclose a method and an apparatus for handling network congestion, and a system. The method includes: obtaining a transmitted data volume of a flow, and identifying a predictable flow and a non-predictable flow in the flow; collecting statistics about total data transmission volumes of the predictable flow and the non-predictable flow; obtaining a congestion transmission model of the predictable flow, and solving the congestion transmission model to obtain a scheduling policy for the predictable flow; and allocating bandwidths to the predictable flow and the non-predictable flow to obtain a bandwidth allocation result, and sending the bandwidth allocation result and the scheduling policy to the host, so that the host executes the scheduling policy in a scheduling period. This can prevent congestion in advance and reduce a delay of a delay-sensitive flow, and is applicable to a large data center.

13 Claims, 8 Drawing Sheets

(51) Int. Cl.
*H04L 47/12* (2022.01)
*H04L 47/56* (2022.01)
*H04L 47/62* (2022.01)
*H04L 47/78* (2022.01)

(56) References Cited

U.S. PATENT DOCUMENTS

| | | | |
|---|---|---|---|
| 2014/0056317 A1* | 2/2014 | Sanders | H04L 43/16 |
| | | | 370/474 |
| 2014/0133859 A1* | 5/2014 | Fang | H04Q 11/0071 |
| | | | 398/76 |
| 2015/0319090 A1 | 11/2015 | Fu et al. | |
| 2016/0080225 A1 | 3/2016 | Yadav et al. | |
| 2019/0059021 A1* | 2/2019 | Corroy | H04W 36/22 |

OTHER PUBLICATIONS

Cen, Shanwei et al., "Flow and Congestion Control for Internet Media Streaming Applications", SPIE , vol. 3310, Jan. 17, 2014 (Jan. 17, 2014), pp. 250-264.
OpenFlow Switch Specification Version 1.5.1 ( Protocol version 0x06 ), Mar. 26, 2015. total 283 pages.

* cited by examiner

METHOD AND APPARATUS FOR HANDLING NETWORK CONGESTION, AND SYSTEM

CROSS-REFERENCE TO RELATED APPLICATIONS

This application is a continuation of International Application No. PCT/CN2018/087672, filed on May 21, 2018, which claims priority to Chinese Patent Application No. 201710477756.9, filed on Jun. 20, 2017. The disclosures of the aforementioned applications are hereby incorporated by reference in their entireties.

TECHNICAL FIELD

The present disclosure relates to the field of communications technologies, and in particular, to a method and an apparatus for handling network congestion, and a system.

BACKGROUND

Currently, a data center includes thousands of computing nodes connected by using a network, to support running of abundant distributed application programs. These distributed application programs usually need to exchange data information of a plurality of computing nodes to perform computing tasks or status maintenance. For example, in throughput-intensive and scalable computing applications, megabytes/gigabytes of data need to be transferred between master and slave nodes, and such a process is similar to an all-to-all communication mode. The throughput-intensive and scalable computing applications may be, for example, MapReduce and Hadoop. For another example, structures of some web applications of a partition/aggregation style typically consist of a set of components with a hierarchical structure. Among these components, a series of parallel requests are transmitted to a plurality of server nodes, and then the server nodes return some results. Finally, a client node aggregates the returned content together to obtain a final result. Such a process is similar to an all-to-one communication mode. The web applications of the partition/aggregation style may be, for example, a web search engine and memcached. Therefore, the current data center network is increasingly becoming a tightly coupled communications network.

The data center network has a problem of network congestion, and this problem is generally caused by throughput-intensive load. If a delay-sensitive application (such as PTPd, memcached, or Naiad) shares the same network with a throughput-intensive application, the delay-sensitive application is likely to suffer a high delay. This is because the throughput-intensive application easily generates a large quantity of data packets and occupies a large part of cache space of a switch in the network, and a real-time data packet is passively queued and waits in the cache, and is even discarded because of buffer overflow.

In addition to the high delay, the throughput may be severely degraded. In the data center, many pieces of application data are stored in different servers in a distributed manner. When a client sends a data request, after intermediate processing, all servers including requested data synchronously send data to the client. These connections pass through a same switch and use a same link to reach the client, and this link is referred to as a bottleneck link. Contending for an egress buffer of the same switch by a plurality of connections easily leads to buffer overflow, resulting in a packet loss, which is generally referred to as transmission control protocol (TCP) incast. In a distributed application scenario, such as MapReduce, cluster storage, and web page search, the client sends a next request only after all connections complete data transmission. Once a packet loss occurs on a TCP connection, retransmission is required, and all other connections are in an idle state and wait for completion of the retransmission. In a time period of waiting for retransmission, utilization of the bottleneck link is far less than a bandwidth of the link, and a network throughput drastically decreases. An extremely low throughput not only makes network performance extremely low, but also makes an advantage of a distributed technology of an application layer unhighlighted, and data transmission efficiency is low.

At present, in a solution at a TCP level, generally $RTO_{min}$ of the TCP can be reduced, where $RTO_{min}$ is a minimum retransmission timeout value in a retransmission timeout (RTO); and the TCP is modified and enhanced, and a TCP congestion control algorithm that relies on displaying of a congestion notification is optimized, for example, a data center transmission control protocol (DCTCP) or an incast congestion control for TCP (ICTCP).

However, only when network congestion occurs, that is, when a specific congestion signal is generated, the foregoing solution makes a corresponding congestion avoidance measure. Therefore, the solution is passive, a function of preventing congestion in advance cannot be achieved, and a risk of invalid retransmission is increased.

SUMMARY

Embodiments of the present disclosure provide a method and an apparatus for handling network congestion, and a system, so as to prevent congestion in advance and reduce a delay of a delay-sensitive flow, and the present disclosure is applicable to a large data center.

According to a first aspect, an embodiment of the present disclosure provides a method for handling network congestion, applied to a system including a host and a switch. This embodiment may be executed by a network controller. The network controller may be arranged in the system as an independent network entity. The method includes:

obtaining a transmitted data volume of a flow, and identifying a predictable flow and a non-predictable flow in the flow;

collecting statistics about total data transmission volumes of the predictable flow and the non-predictable flow;

obtaining a congestion transmission model of the predictable flow, and solving the congestion transmission model to obtain a scheduling policy for the predictable flow; and allocating bandwidths to the predictable flow and the non-predictable flow to obtain a bandwidth allocation result, and sending the bandwidth allocation result and the scheduling policy to the host, so that the host executes the scheduling policy in a scheduling period.

In this embodiment, the flow may be an open flow, and the open flow is classified into two types in this embodiment: a predictable flow and a non-predictable flow. The predictable flow may be defined as a flow with a predictable data transmission volume within a time period, and other flows are considered as non-predictable flows. The congestion transmission model may be obtained through dynamic calculation, and a solution is provided in a subsequent embodiment. The congestion transmission model may be constructed and solved by using a principle that a queue of a data packet in an entire network system is the shortest. In this embodiment, a bandwidth may be equivalently considered as duration for transmitting a data packet in a time window.

In one embodiment, three manners of obtaining a transmitted data volume of a flow are further provided, and the obtaining a transmitted data volume of a flow includes:

sending a query request to the switch to query a transmitted data volume of a flow forwarded by the switch within a period, and receiving and collecting statistics about a query result returned by the switch; or receiving a transmitted data volume that is sent by the host and that is of a flow sent through the host; or receiving a transmitted data volume that is of a flow and that is obtained through statistics collecting by a host used as a serving host, where the flow includes a flow sent through at least two hosts other than the serving host.

In this embodiment, the host used as the serving host may be a host selected from a host rack, so as to reduce a data transmission volume.

In one embodiment, the identifying a predictable flow and a non-predictable flow in the flow includes:

calculating a traffic matrix based on a statistical result of the transmitted data volume; and when determining that an error between a most recently transmitted data volume of a flow f in the traffic matrix and an average data volume of the flow f within a preset time period is less than a preset threshold, determining the flow f as a predictable flow; otherwise, determining the flow f as a non-predictable flow.

The foregoing flow f may be any flow in the foregoing flows whose transmitted data volumes have been obtained, or may be equivalently considered as any flow in the traffic matrix.

In one embodiment, a manner of obtaining the congestion transmission model of the predictable flow is further provided. In one embodiment, the obtaining a congestion transmission model of the predictable flow includes:

obtaining $D_\tau = f(\tau, k_{first}) - a(\tau, k_{last})$, where $\tau$ is a data packet in the flow; $D_\tau$ is a sum of transmission delays of $\tau$ on all switches on a path; $k_{first}$ and $k_{last}$ are respectively the first switch and the last switch that $\tau$ passes through on the forwarding path; $a(\tau, k_{last})$ indicates a moment at which $\tau$ arrives at $k_{last}$; and $f(\tau, k_{first})$ indicates a moment at which T completes transmission on $k_{first}$.

In one embodiment, an implementation of solving the congestion transmission model to obtain a scheduling policy for the predictable flow is further provided as follows: The solving the congestion transmission model to obtain a scheduling policy for the predictable flow includes:

solving the congestion transmission model to obtain the scheduling policy for the predictable flow by using hybrid genetic algorithm and simulated annealing or a heuristic algorithm.

In one embodiment, when hybrid genetic algorithm and simulated annealing is used, a chromosome is encoded by using a value, a length of the chromosome is a quantity of data packets, and each gene in the chromosome is a moment at which each data packet starts to be sent from a host. A selection operator, a crossover operator, and a mutation operator are respectively roulette wheel selection, double point cross-over, and bit-inversion mutation.

In one embodiment, a solution of allocating bandwidths to the predictable flow and the non-predictable flow is as follows: The allocating bandwidths to the predictable flow and the non-predictable flow includes:

allocating send time windows to the predictable flow and the non-predictable flow respectively, where different time windows use different time lengths.

In one embodiment, the send time window allocated to the predictable flow includes:

$$wl_{predict} = \frac{MTU}{bw_{max}} * N,$$

where $wl_{predict}$ is a time length of the send window of the predictable flow, $bw_{max}$ is a fastest link connecting the host and a network, MTU is a maximum transmission unit, and N is a value provided by the switch.

In one embodiment, the send time window allocated to the non-predictable flow includes:

$$wl_{normal} = \frac{T_{normal}}{T_{predict}} * wl_{predict},$$

where $wl_{normal}$ is a time length of the send window of the non-predictable flow, $wl_{predict}$ is a time length of the send window of the predictable flow, $T_{predict}$ is a total transmitted data volume of a predictable flow in a previous scheduling period, and $T_{normal}$ is a total transmitted data volume of the non-predictable flow.

According to a second aspect, an embodiment of the present disclosure further provides a method for handling network congestion, applied to a host in a system including the host and a switch, where the host may be a terminal host, and the terminal host may be any terminal host served by a large data center. A form is not limited in this embodiment. The method includes:

receiving a bandwidth allocation result and a scheduling policy from a network controller, where the bandwidth allocation result includes information about a bandwidth occupied by each of a predictable flow and a non-predictable flow; and storing data packets of the predictable flow and the non-predictable flow respectively by using two queues, and sending the data packets in the two queues based on the scheduling policy and the allocation result.

For descriptions of the predictable flow and the non-predictable flow, refer to the foregoing descriptions, and details are not described herein again. The two queues store the data packets of the predictable flow and the non-predictable flow respectively, so that the data packets of the predictable flow and the non-predictable flow are conveniently sent in respective bandwidths.

In one embodiment, due to a characteristic of the predictable flow, a data packet of the predictable flow needs to be sent at a relatively specific moment in a scheduling policy. Therefore, it may be set that a data packet of only one predictable flow is sent in one scheduling period. In one embodiment, the information about the occupied bandwidth includes a time length of a send time window occupied in one scheduling period.

The sending the data packets in the two queues includes:

sending, in a scheduling period, a data packet in a queue in which one predictable flow is located, and sending, in a scheduling period, a data packet in a queue in which one or more non-predictable flows are located.

According to a third aspect, an embodiment of the present disclosure further provides an apparatus for handling network congestion, applied to a system including a host and a switch, where the apparatus includes:

a data obtaining unit, configured to obtain a transmitted data volume of a flow;

an identification unit, configured to identify a predictable flow and a non-predictable flow in the flow;

a statistics collecting unit, configured to collect statistics about total data transmission volumes of the predictable flow and the non-predictable flow;

a model obtaining unit, configured to obtain a congestion transmission model of the predictable flow;

a policy solving unit, configured to solve the congestion transmission model to obtain a scheduling policy for the predictable flow;

a bandwidth allocation unit, configured to allocate bandwidths to the predictable flow and the non-predictable flow to obtain a bandwidth allocation result; and a sending unit, configured to send the bandwidth allocation result and the scheduling policy to the host, so that the host executes the scheduling policy in a scheduling period.

In one embodiment, the data obtaining unit is configured to: send a query request to the switch to query a transmitted data volume of a flow forwarded by the switch within a period, and receive and collect statistics about a query result returned by the switch; or configured to receive a transmitted data volume that is sent by the host and that is of a flow sent through the host; or configured to receive a transmitted data volume that is of a flow and that is obtained through statistics collecting by a host used as a serving host, where the flow includes a flow sent through at least two hosts other than the serving host.

In one embodiment, the identification unit is configured to: calculate a traffic matrix based on a statistical result of the transmitted data volume; and when determining that an error between a most recently transmitted data volume of a flow f in the traffic matrix and an average data volume of the flow f within a preset time period is less than a preset threshold, determine the flow f as a predictable flow; otherwise, determine the flow f as a non-predictable flow.

In one embodiment, the model obtaining unit is configured to obtain $D_\tau = f(\tau, k_{first}) - a(\tau, k_{last})$, where $\tau$ is a data packet in the flow; $D_\tau$ is a sum of transmission delays of $\tau$ on all switches on a path; $k_{first}$ and $k_{last}$ are respectively the first switch and the last switch that $\tau$ passes through on the forwarding path; $a(\tau, k_{last})$ indicates a moment at which $\tau$ arrives at $k_{last}$; and $f(\tau, k_{first})$ indicates a moment at which $\tau$ completes transmission on $k_{first}$.

In one embodiment, the policy solving unit is configured to solve the congestion transmission model to obtain the scheduling policy for the predictable flow by using hybrid genetic algorithm and simulated annealing or a heuristic algorithm.

In one embodiment, the policy solving unit is configured to: when hybrid genetic algorithm and simulated annealing is used, encode a chromosome by using a value, where a length of the chromosome is a quantity of data packets, each gene in the chromosome is a moment at which each data packet starts to be sent from a host, and a selection operator, a crossover operator, and a mutation operator are respectively roulette wheel selection, double point cross-over, and bit-inversion mutation.

In one embodiment, the bandwidth allocation unit is configured to allocate send time windows to the predictable flow and the non-predictable flow respectively, where different time windows use different time lengths.

In one embodiment, the send time window allocated by the bandwidth allocation unit to the predictable flow includes:

$$wl_{predict} = \frac{MTU}{bw_{max}} * N,$$

where $wl_{predict}$ is a time length of the send window of the predictable flow, $bw_{max}$ is a fastest link connecting the host and a network, MTU is a maximum transmission unit, and N is a value provided by the switch.

In one embodiment, the send time window allocated by the bandwidth allocation unit to the non-predictable flow includes:

$$wl_{normal} = \frac{T_{normal}}{T_{predict}} * wl_{predict},$$

where $wl_{normal}$ is a time length of the send window of the non-predictable flow, $wl_{predict}$ is a time length of the send window of the predictable flow, $T_{predict}$ is a total transmitted data volume of a predictable flow in a previous scheduling period, and $T_{normal}$ is a total transmitted data volume of the non-predictable flow.

According to a fourth aspect, an embodiment of the present disclosure further provides an apparatus for handling network congestion, applied to a host in a system including the host and a switch, where the apparatus includes:

a receiving unit, configured to receive a bandwidth allocation result and a scheduling policy from a network controller, where the bandwidth allocation result includes information about a bandwidth occupied by each of a predictable flow and a non-predictable flow; and an execution unit, configured to: store data packets of the predictable flow and the non-predictable flow respectively by using two queues, and send the data packets in the two queues based on the scheduling policy and the allocation result.

In one embodiment, the information about the occupied bandwidth includes a time length of a send time window occupied in one scheduling period.

That the execution unit is configured to send the data packets in the two queues includes: the execution unit is configured to send, in a scheduling period, a data packet in a queue in which one predictable flow is located, and send, in a scheduling period, a data packet in a queue in which one or more non-predictable flows are located.

According to a fifth aspect, an embodiment of the present disclosure further provides a network controller, including a communications device, a processor, and a memory.

The communications device is configured to establish communication connections to a host and a switch; the memory stores an executable instruction; and the processor implements the method according to any of the embodiments when executing the executable instruction.

According to a sixth aspect, an embodiment of the present disclosure further provides a host, including a communications device, a processor, and a memory.

The communications device is configured to establish communication connections to a network controller and a switch; the memory stores an executable instruction; and the processor implements the method according to any of the embodiments when executing the executable instruction.

According to a seventh aspect, an embodiment of the present disclosure further provides a computer storage medium, where the computer storage medium stores a computer program, the computer program includes a program instruction, and when the program instruction is executed by a processor, the processor is enabled to perform any method provided in the embodiments of the present disclosure.

According to an eighth aspect, an embodiment of the present disclosure further provides a network system, including a network controller, a host, and a switch. The network controller is a device that has a function of the network controller in the embodiments of the present disclosure. The host is a device that has a function of the host provided in the embodiments of the present disclosure.

According to a ninth aspect, an embodiment of the present disclosure further provides a network system, including a network controller, a host, and a switch. The network controller includes a monitoring module, a scheduling module, and a server module. The host includes a client, a queuing rule module, and a network interface card. The monitoring module and the switch establish a communication connection between the network controller and the switch, the server module and the client establish a communication connection between the network controller and the host, and the network interface card establishes a communication connection between the host and the switch.

The monitoring module is configured to: obtain a transmitted data volume of a flow, identify a predictable flow and a non-predictable flow in the flow, and collect statistics about total data transmission volumes of the predictable flow and the non-predictable flow.

The scheduling module is configured to: obtain a congestion transmission model of the predictable flow, solve the congestion transmission model to obtain a scheduling policy for the predictable flow, and allocate bandwidths to the predictable flow and the non-predictable flow, to obtain a bandwidth allocation result.

The server module is configured to send the bandwidth allocation result and the scheduling policy to the client.

The client is configured to send the bandwidth allocation result and the scheduling policy to the queuing rule module.

The queuing rule module is configured to store data packets of the predictable flow and the non-predictable flow respectively by using two queues.

The network interface card is configured to send the data packets in the two queues based on the scheduling policy and the allocation result.

In one embodiment, the information about the occupied bandwidth includes a time length of a send time window occupied in one scheduling period.

That the network interface card is configured to send the data packets in the two queues includes:
sending, in a scheduling period, a data packet in a queue in which one predictable flow is located, and sending, in a scheduling period, a data packet in a queue in which one or more non-predictable flows are located.

In one embodiment, the identifying a predictable flow and a non-predictable flow in the flow includes:
calculating a traffic matrix based on a statistical result of the transmitted data volume; and when determining that an error between a most recently transmitted data volume of a flow f in the traffic matrix and an average data volume of the flow f within a preset time period is less than a preset threshold, determining the flow f as a predictable flow; otherwise, determining the flow f as a non-predictable flow.

In one embodiment, that the monitoring module is configured to obtain a congestion transmission model of the predictable flow includes:
obtaining $D_\tau = f(\tau, k_{first}) - a(\tau, k_{last})$, where $\tau$ is a data packet in the flow; $D_\tau$ is a sum of transmission delays of $\tau$ on all switches on a path; $k_{first}$ and $k_{last}$ are respectively the first switch and the last switch that $\tau$ passes through on the forwarding path; $a(\tau, k_{last})$ indicates a moment at which $\tau$ arrives at $k_{last}$; and $f(\tau, k_{first})$ indicates a moment at which $\tau$ completes transmission on $k_{first}$.

In one embodiment, that the scheduling module is configured to solve the congestion transmission model to obtain a scheduling policy for the predictable flow includes:
solving the congestion transmission model to obtain the scheduling policy for the predictable flow by using hybrid genetic algorithm and simulated annealing or a heuristic algorithm.

In one embodiment, when hybrid genetic algorithm and simulated annealing is used,
a chromosome is encoded by using a value, a length of the chromosome is a quantity of data packets, and each gene in the chromosome is a moment at which each data packet starts to be sent from a host. A selection operator, a crossover operator, and a mutation operator are respectively roulette wheel selection, double point cross-over, and bit-inversion mutation.

In one embodiment, that the scheduling module is configured to allocate bandwidths to the predictable flow and the non-predictable flow includes:
allocating send time windows to the predictable flow and the non-predictable flow respectively, where different time windows use different time lengths.

In one embodiment, the send time window allocated by the scheduling module to the predictable flow includes:

$$wl_{predict} = \frac{MTU}{bw_{max}} * N,$$

where $wl_{predict}$ is a time length of the send window of the predictable flow, $bw_{max}$ is a fastest link connecting the host and a network, MTU is a maximum transmission unit, and N is a value provided by the switch.

In one embodiment, the send time window allocated by the scheduling module to the non-predictable flow includes:

$$wl_{normal} = \frac{T_{normal}}{T_{predict}} * wl_{predict},$$

where $wl_{normal}$ is a time length of the send window of the non-predictable flow, $wl_{predict}$ is a time length of the send window of the predictable flow, $T_{predict}$ is a total transmitted data volume of a predictable flow in a previous scheduling period, and $T_{normal}$ is a total transmitted data volume of the non-predictable flow.

It can be learned from the foregoing technical solutions that the embodiments of the present disclosure have the following advantages: Based on predictability of some flows, for example, predictability of a throughput-intensive flow, flows are classified into a predictable flow and a non-predictable flow, and the two types of flows are separately scheduled; and the technical solutions of the present disclosure are an active congestion handling mechanism, can prevent congestion in advance and reduce a delay of a delay-sensitive flow, and are applicable to a large data center.

BRIEF DESCRIPTION OF DRAWINGS

To describe the technical solutions in the embodiments of the present disclosure or in the background more clearly, the following briefly describes the accompanying drawings required for describing the embodiments of the present disclosure or the background.

DESCRIPTION OF EMBODIMENTS

The embodiments of the present disclosure are described below with reference to the accompanying drawings in the embodiments of the present disclosure.

In the embodiments of this application, the OpenFlow protocol and a software-defined networking (SDN) architecture are used, and a method for avoiding data center network congestion is designed for a data center network. In the solutions of the embodiments of the present disclosure, a transmission delay of a data packet in the network is abstracted. Because a queue length in a switch cache is directly related to the transmission delay of the data packet, an optimal model for low-congestion transmission is constructed in the embodiments of this application, that is, an end-to-end transmission delay of a data packet in a throughput-intensive flow in the entire network is minimized, so as to reduce a queue length in the cache. Hybrid genetic algorithm and simulated annealing (GASA) is used to solve a time for sending a data packet by each host. In addition, this mechanism also exploits short-term predictability of a throughput-intensive flow and periodically schedules transmission of a data packet of a predictable flow, so as to avoid network congestion fundamentally. In the solutions in the embodiments of the present disclosure, different bandwidths may be periodically allocated to a predictable flow and another common flow, so as to meet different task requirements.

In the embodiments of this application, there are the following four aspects of a data packet sending coordination mechanism that can avoid network congestion:

1. Active mechanism: A scheduling arrangement for congestion avoidance is made in advance based on predictability of a throughput-intensive flow, instead of passively responding according to a corresponding congestion signal.

2. Extensibility: A scheduling arrangement is periodically formulated based on predictability of a throughput-intensive flow, and there is no need to make a new arrangement each time a data packet is sent; and this may be used in a large data center.

3. Congestion transmission model: An optimal model for minimizing a transmission delay of a data packet of a predictable flow in the entire network is constructed, and sending of the data packet of the predictable flow is coordinated, so as to minimize a queue length in a switch cache.

4. Dynamic bandwidth allocation for different types of flows: In a manner similar to time division multiple access (TDMA), different bandwidths are allocated based on volumes of data transmitted within a past period of time in a predictable flow and a non-predictable flow, so that the bandwidths are properly used.

Figure 1:
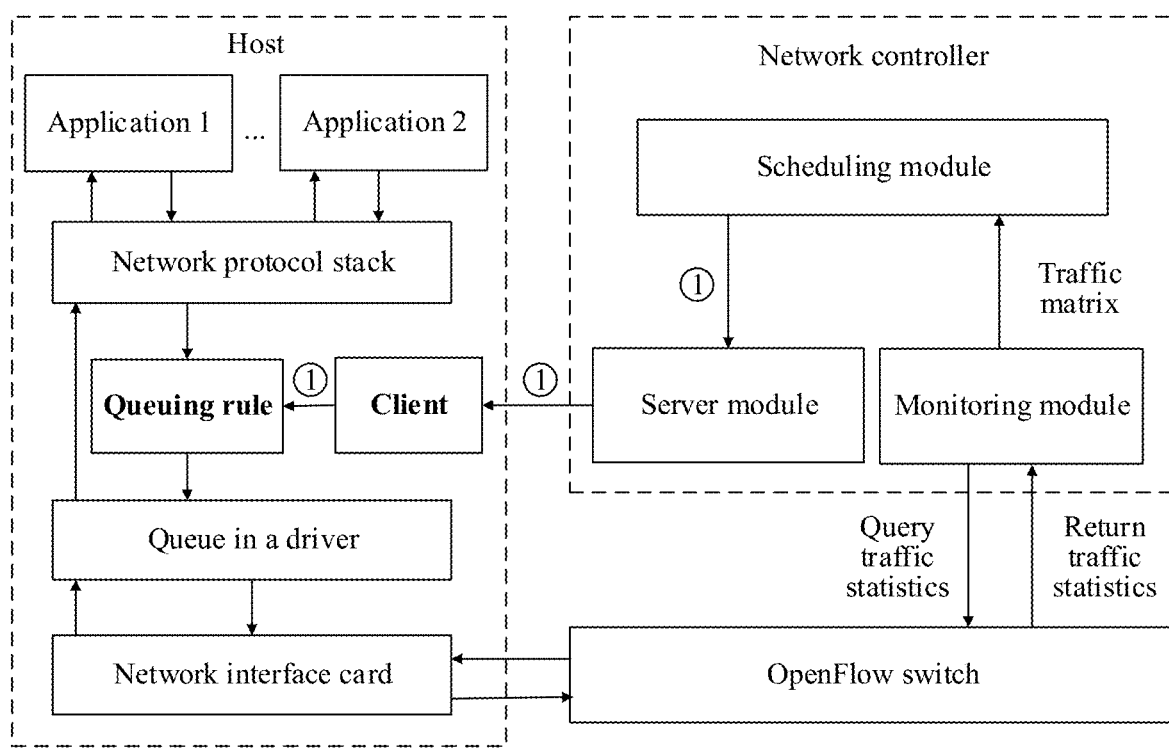
FIG. 1 is a schematic diagram of a system architecture according to an embodiment of the present disclosure.

FIG. 1 shows an architecture of a congestion avoidance mechanism according to an embodiment of this application, where ① represents an optimal scheduling policy, and other unannotated arrows represent transmission directions of data packets. FIG. 1 mainly includes a host, a network controller, and an OpenFlow switch. The host includes a plurality of applications, a network protocol stack, a queuing rule, a client, a queue in a driver, and a network interface card. The network controller includes a scheduling module, a server module, and a monitoring module.

Many distributed applications of a MapReduce style run in a modern data center. In such an application, a task is cooperatively completed by one master node and a plurality of slave nodes, and a completion process is divided into two operations, that is, map and reduce. In the first operation, the master node assigns the task to a plurality of slave nodes by using a series of commands. In the second operation, after completing processing of received data blocks, the slave nodes return results to the master node. Compared with the first operation, the second operation is a bandwidth intensive process, and generally megabytes/gigabytes of data need to be transmitted. In this process, the transmitted data traffic is relatively stable in a time scale. Since network congestion in a data center is mainly caused by throughput-intensive flows and these flows have short-term predictability, the present disclosure utilizes this feature to formulate an effective coordinated scheduling policy for the throughput-intensive flows in advance.

FIG. 1 is an architectural diagram of this application. The OpenFlow protocol and a software-defined networking (SDN) architecture are used, and the architecture mainly includes three parts: the host, which is a terminal host; the OpenFlow switch, which is a switch that supports the OpenFlow protocol; and the network controller. The network controller includes three modules:

1. The monitoring module is responsible for obtaining a status of a data volume transmitted in each flow, generating a traffic matrix, then identifying a predictable flow in the flows based on the traffic matrix, collecting statistics about total volumes of transmitted data of the predictable flow and a non-predictable flow respectively, and sending a result to the scheduling module. The monitoring module may obtain, in a manner of periodically querying the switch, the status of the data volume transmitted in each flow; or the switch may actively report the status of the data volume transmitted in each flow; or another device obtains the status of the data volume transmitted in each flow, then summarizes the statuses, and sends the statuses to the monitoring module. The manner of periodically querying the switch may be: The monitoring module periodically sends a traffic statistics query request to the switch, and then receives a traffic statistics collection result returned by the switch.

2. The scheduling module is responsible for formulating a globally optimal coordinated scheduling policy for the predictable flow, and formulating a bandwidth allocation scheme for the predictable flow and the common non-predictable flow. The scheduling module may also receive the traffic matrix generated by the monitoring module to assist in generation of the scheduling policy.

3. The server module is responsible for communicating with a client module in the terminal host, and is configured to send a series of scheduling policies formulated by the scheduling module to the terminal host.

There are two modules in a kernel of the terminal host:

1. The client module, responsible for communicating with the server module in the network controller, and configured to receive a data packet scheduling policy formulated by the controller; and 2. A queuing rule module, also referred to as a traffic control module, configured to perform traffic control and execute the latest data packet scheduling policy received by the client module. A classification and queuing rule (Qdisc) may be used for traffic control.

The following describes technical solutions of modules in the system architecture in this embodiment of this application.

Figure 2:
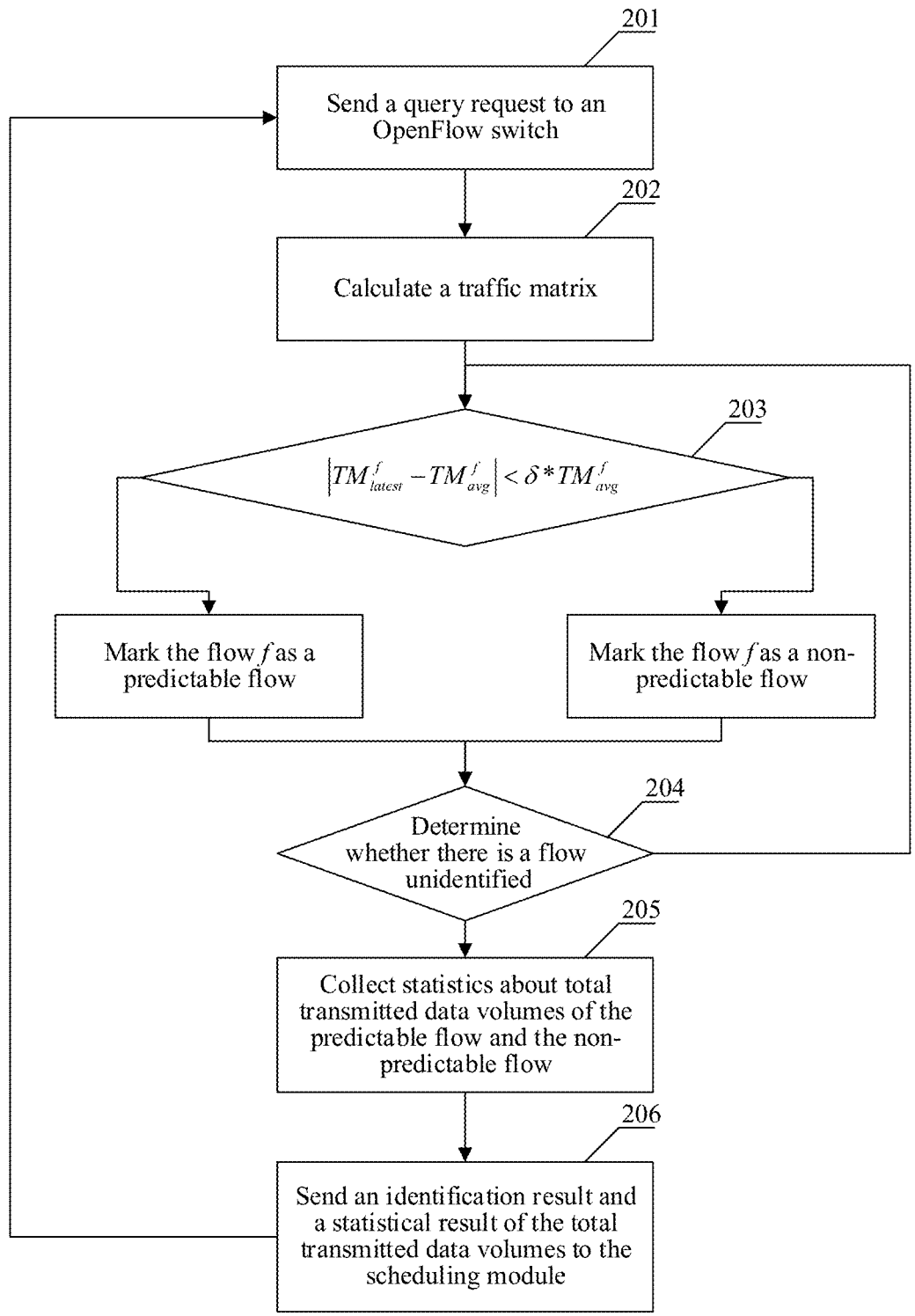
FIG. 2 is a working flowchart of a monitoring module according to an embodiment of the present disclosure.

1. Monitoring Module:

The monitoring module periodically queries a data volume transmitted in each flow in the network, to identify a predictable flow. A working procedure of the monitoring module is shown in FIG. 2, and operations are as follows:

201. The monitoring module sends a query request to the OpenFlow switch, where query content is a transmitted data volume of each flow in a previous period (for example, 0.1 seconds).

The query request may be sent by the monitoring module to the OpenFlow switch by using an OpenFlow application programming interface (API).

The foregoing query request may be sent periodically.

202. Calculate an end-to-end traffic matrix $TM_{latest}$ based on a statistical value of the data volumes of the flows that is returned by the OpenFlow switch.

203. Extract an unidentified flow f from the traffic matrix $TM_{latest}$, calculate an average data volume $TM_{avg}^f$ of the flow f in the latest 10 traffic matrices (if the query period is 0.1 seconds, these traffic matrices are statistical records within 1 second), and if an error between a data volume $TM_{latest}^f$ of the flow f in the most recently received traffic matrix and the current average value $TM_{avg}^f$ is less than δ (for example, 20%), the scheduling module marks the flow f as a predictable flow; otherwise, the scheduling module marks the flow as a non-predictable flow, which is also referred to as a common flow.

The foregoing determining process may be expressed by using a formula:

$$|TM_{latest}^f - TM_{avg}^f| < \delta * TM_{avg}^f.$$

The foregoing common flow, that is, another flow other than the predictable flow, may be considered as a non-predictable flow.

204. Determine whether there is still a flow unidentified, and if there is an unidentified flow in the most recently received traffic matrix $TM_{latest}$, jump to 203; or if there is no unidentified flow, perform 205.

205. Collect statistics about total transmitted data volumes of the predictable flow $T_{predict}$ and the non-predictable flow $T_{normal}$ respectively.

206. Send an identification result and a statistical result of the total transmitted data volumes to the scheduling module.

The identification result is the predictable flow $T_{predict}$ and the non-predictable flow $T_{normal}$. The total transmitted data volumes may include a total transmitted data volume of the predictable flow $T_{predict}$ and a total transmitted data volume of the non-predictable flow $T_{normal}$ 2. Scheduling Module:

The scheduling module is responsible for periodically formulating a globally optimal coordinated scheduling policy for the predictable flow, and formulating a bandwidth allocation scheme for the predictable flow and the non-predictable flow.

The scheduling module has two tasks: (1) Constructing a "congestion transmission model" for the predictable flow, using a heuristic algorithm, that is, hybrid genetic algorithm and simulated annealing (GASA), to solve the model, where a result of the solving is a time point at which each host sends a data packet in a predictable flow; and (2) Allocating bandwidths to the predictable flow and the non-predictable flow, which is similar to a TDMA manner, that is, defining send time windows of different lengths for the two types of flows.

Figure 3:
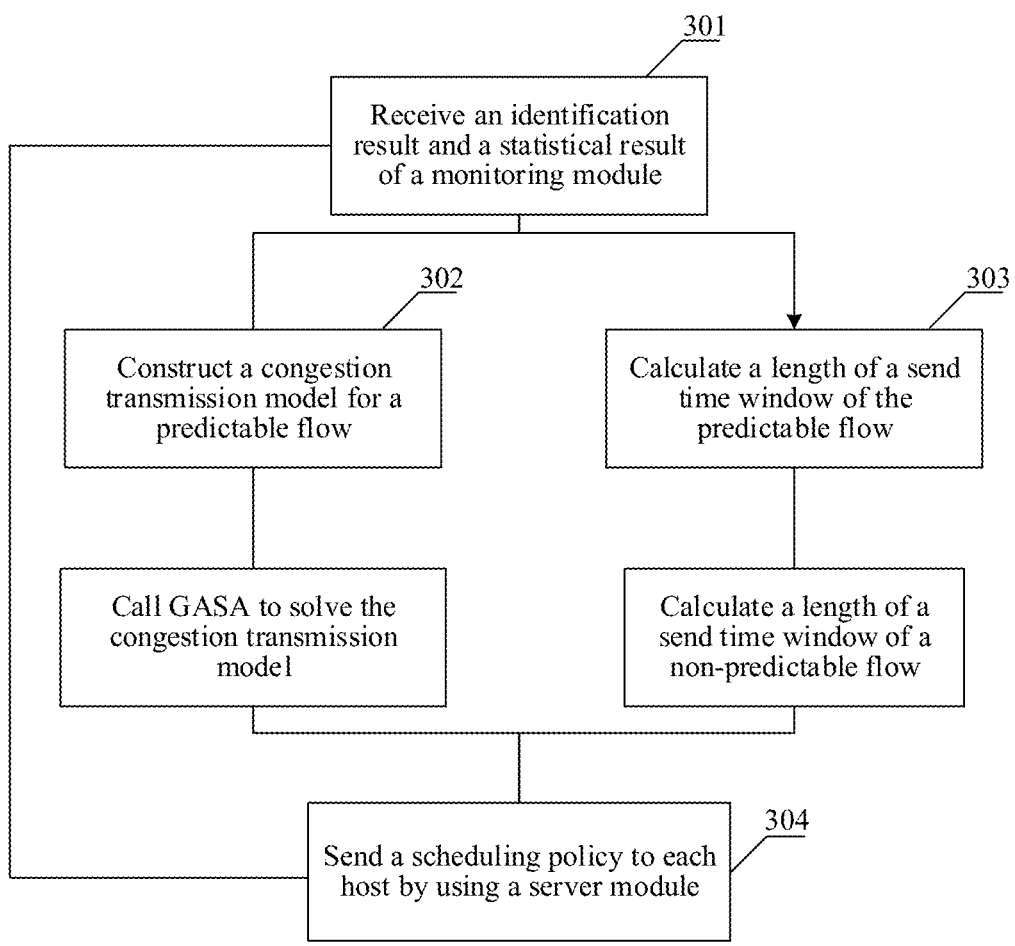
FIG. 3 is a working flowchart of a scheduling module according to an embodiment of the present disclosure.

As shown in FIG. 3, a working procedure of the scheduling module includes the following operations:

301. Receive an identification result and a statistical result of the monitoring module.

The identification result and the statistical result herein are the identification result and the statistical result of the total transmitted data volume that are obtained by the monitoring module in operation 206 in the foregoing embodiment.

302. Construct a congestion transmission model for the predictable flow, and call GASA to solve the congestion transmission model.

303. Calculate a length of a send time window of the predictable flow, and calculate a length of a send time window of the non-predictable flow.

304. Send the scheduling policy to each host by using the server module.

The following separately describes in detail the congestion transmission model, an algorithm for solving the congestion transmission model, and dynamic bandwidth allocation. The congestion transmission model mainly relates to content of constructing the congestion transmission model for the predictable flow in operation 302. The algorithm for solving the congestion transmission model may be implemented by calling GASA for solving. Dynamic bandwidth allocation mainly relates to lengths of send time windows of the predictable flow and the non-predictable flow.

Congestion Transmission Model:

Network congestion occurs because data packets are simultaneously sent in a plurality of flows that pass through a same switch. A direct method for avoiding this problem is to coordinate sending of the data packets of these flows. A simple method is to use a polling method to send data packets one flow after another. However, this manner causes a severe decrease in a throughput. For example, if two flows do not pass through a same switch, data packets are also sent in a polling manner, and this easily wastes a bandwidth.

Therefore, an optimization model needs to be constructed. Network congestion is intuitively represented as an excessively long queue in a switch cache, and instinctively a model for minimizing lengths of queues in all caches needs to be constructed. However, this is excessively abstracted, and modeling needs to be performed from another perspective.

An end-to-end transmission delay of a data packet includes three parts: 1. A propagation time on a link; 2. A transmission time on an egress port of a switch; and 3. A time for queuing and waiting in a switch cache. The first two times are fixed. Only the time of the data packet for queuing and waiting in the cache can be controlled. In addition, the end-to-end transmission delay of the data packet is mainly a time of the data packet for queuing and waiting. Therefore, the end-to-end transmission delay of the data packet is directly related to a length of a queue in a switch cache. Constructing a model for minimizing transmission delays of all data packets is to minimize a length of a queue in a switch cache.

Figure 4:
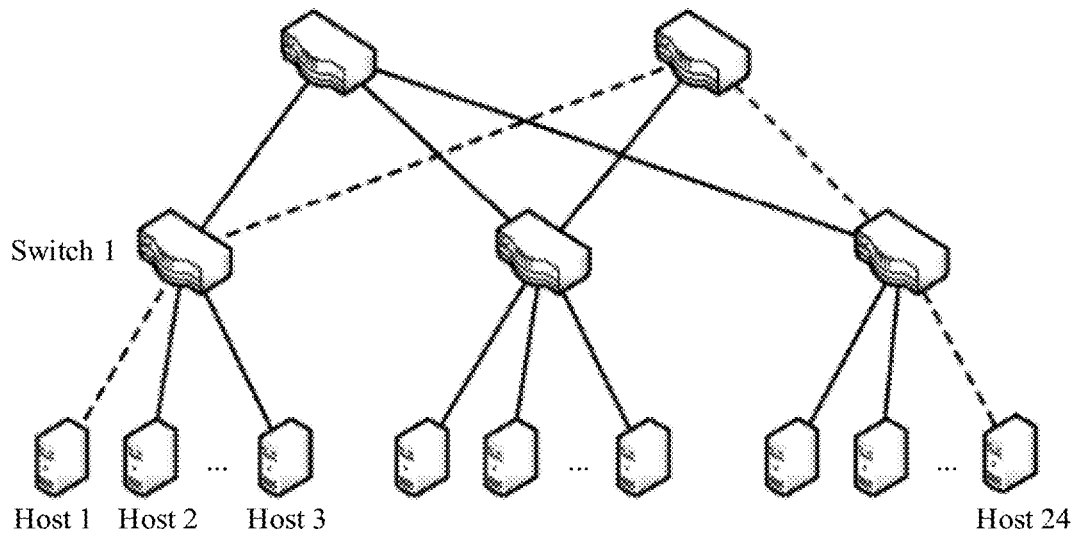
FIG. 4 is a schematic diagram of a two-layer data center network topology according to an embodiment of the present disclosure.

Herein, how a data packet is transmitted in a network is first described. As shown in FIG. 4, if a host 1 needs to transmit a data packet to a host 24, a dashed line in the figure is a transmission path of the data packet. First, the data packet is sent from a network interface card of the host 1, and then arrives at a switch 1 after being propagated through a physical link. In this case, if a port of the switch 1 is occupied (that is, a previous data packet has arrived and needs to be transmitted), the data packet queues and waits in a cache of the switch 1. If the port is idle, the switch 1 sends the data packet to a next switch on the path, and in this manner, the data packet finally reaches the host 24.

Network devices through which a data packet passes during transmission include a host and a switch. An optimization objective of a model is to reduce a time of a data packet for queuing and waiting in a switch cache. Therefore, only the switch is considered in the model. The following definitions are given: A symbol $\tau$ indicates a data packet, a indicates a moment at which $\tau$ arrives at a switch, and s and f respectively indicate a moment at which $\tau$ starts to be sent from the switch and a time of completing sending. For example, a moment at which $\tau$ arrives at the $k^{th}$ switch on a transmission path is represented as $a(\tau,k)$, a moment at which $\tau$ starts to be sent from the $k^{th}$ switch is $s(\tau,k)$, and a moment of completing transmission is $f(\tau,k)$. In addition, the first switch on the path is a switch directly connected to a sending host, and the last switch is a switch directly connected to a destination receiving host.

It is assumed that a data packet $\tau$ queues and waits in a cache of the $k^{th}$ switch, and a scheduler of the $k^{th}$ switch determines to send $\tau$ to a next switch at a moment $s(\tau,k)$. A particular transmission time is required for sending a data packet from a port of a switch, and the time is related to a length $l_\tau$ of the data packet and a bandwidth $bw_k$ of a link. Therefore, the following constraint may be obtained:

$$f(\tau, k) = s(\tau, k) + c(\tau, k) \quad (1)$$

$$c(\tau, k) = \frac{l_\tau}{bw_k} \quad (2)$$

where $\tau \in T$, T is a set of all data packets that need to be transmitted, and $c(\tau,k)$ indicates a time required for sending $\tau$ from a port of the $k^{th}$ switch.

Data packet propagation on the link is very fast, and a propagation time can be almost ignored. Therefore, a moment at which $\tau$ arrives at the $(k+1)^{th}$ switch is equal to a moment of completing transmission of $\tau$ on the $k^{th}$ switch:

$$a(\tau, k+1) = f(\tau, k) \quad (3)$$

Because another data packet may have queued in a cache before $\tau$ arrives at the $(k+1)^{th}$ switch, $\tau$ cannot be immediately sent to a next switch:

$$a(\tau, k) \leq s(\tau, k) \quad (4)$$

It should be noted that a data packet in the predictable flow needs to be sent by the host within a specified send window time:

$$s_0(\tau) \leq w_l \quad (5)$$

where $s_0(\tau)$ indicates a moment at which $\tau$ starts to be sent by the host, and $w_l$ indicates a time length of the send window.

The above constraints (1) to (5) is just for one data packet and is not sufficient to construct a model of an entire network scope. Because a data center network uses statistical multiplexing, and may be simultaneously shared by a plurality of data packets in a plurality of flows, transmission between the data packets has mutual impact. For example, in FIG. 4, it is assumed that data packets $\tau_i$ and $\tau_j$ are respectively sent by the host 1 and a host 2 to the switch 1. If the two data packets arrive at the switch 1 at the same time, a conflict occurs. In this case, only one data packet can occupy an egress port of the switch 1, and the other data packet needs to wait in a cache:

$$\forall \tau_i, \tau_j \in T, i \neq j \text{ and } s(\tau_i, k_m) \neq s(\tau_j, k_n) \quad (6)$$

where $k_m \in N_{\tau_i}, k_n \in N_{\tau_j}$, and $k_m$ and $k_n$ are corresponding to a same switch.

An egress port of a switch can transmit only one data packet at a same moment. Herein, $t_s$ is defined as a time point, $t_s \in [0, t_f]$, and $t_f$ indicates a time for completing transmission of all data packets from a sending host to a receiving host. A three-dimensional array e represents a relationship between a time point $t_s$, a switch n, and a data packet $\tau$. When $\tau$ occupies an egress port of the switch n at the time point $t_s$, $e(t_s, n, \tau)=1$ otherwise, $e(t_s, n, \tau)=0$. If $\tau$ is arranged to be sent from the egress port of the switch n, the port is always occupied by $\tau$ within a time from a moment of starting transmission from the port to a moment of completing the transmission:

$$\forall t_s \in [s(\tau, n), f(\tau, n)] \text{ and } e(t_s, n, \tau) = 1 \quad (7)$$

In addition, the port can be occupied by only one data packet at a same moment.

$$\forall t_s \in [0, t_f], n \in N_{sw} \text{ and } \sum_{\tau \in T} e(t_s, n, \tau) \leq 1 \quad (8)$$

The constraints (6) to (8) may be expressed in another manner. For each pair of data packets $\tau_i$ and $\tau_j$ in the switch n, a transmission complete time of $\tau_i$ is earlier than a transmission start time of $\tau_j$, or a transmission start time of $\tau_i$ is later than a transmission complete time of $\tau_j$:

$$\forall \tau_i, \tau_j \in T, i \neq j, n \in N_{sw}$$
$$\gamma_1, \gamma_2 \in \{0, 1\}$$

-continued $$\begin{cases} f(\tau_i, n) - s(\tau_j, n) \le \gamma_1 * INF \\ f(\tau_j, n) - s(\tau_i, n) \le \gamma_2 * INF \\ \gamma_1 + \gamma_2 = 1 \end{cases} \quad (9)$$

where both $\gamma_1$ and $\gamma_2$ are binary variables, and INF is an infinite positive number.

According to the above analysis, a transmission delay of the data packet τ in the switch n may be represented as [f(τ,n)−a(τ,n)], and an entire end-to-end delay $D_\tau$ of τ may be represented as a sum of transmission delays of τ in all switches on the path:

$$D_\tau = \sum_{k \in N_\tau} [f(\tau, k) - a(\tau, k)] \quad (10)$$

where $N_\tau$ is a set of all switches on the transmission path of τ For simplicity, the equation (10) can be written simply as:

$$D_\tau = f(\tau, k_{first}) - a(\tau, k_{last}) \quad (11)$$

where $k_{first}$ is the first switch on the transmission path of τ, and $k_{last}$ is the last switch.

When a sum of end-to-end transmission delays of all data packets reaches a minimum, low-congestion transmission can be implemented:

$$\min D_T = \sum_{\tau \in T} D_\tau \quad (12)$$

where $D_T$ indicates the total transmission delay of all the data packets, and the equation (12) needs to meet the constraints (1) to (9).

It should be noted that $D_\tau$ may be a minimum value only when the following conditions are met:

$$\forall k \in N_{sw} \text{ and } a(\tau, k) = s(\tau, k) \quad (13)$$

This means that each data packet is immediately sent when arriving at a switch. Ideally, queuing is not needed on egress ports of all switches through which all the data packets pass, which is also an optimization objective of the formula(12).

Algorithm for solving the congestion transmission model:

To solve the foregoing optimization problem, hybrid genetic algorithm and simulated annealing (GASA) is designed in the embodiments of this application. In this algorithm, a chromosome is encoded by using a value, a length of the chromosome is a quantity of data packets, and each gene in the chromosome is a moment at which each data packet starts to be sent from a host. In this embodiment of this application, roulette wheel selection, double point cross-over, and bit-inversion mutation are respectively selected for a selection operator, a crossover operator, and a mutation operator. Operations of the algorithm are as follows:

Operation 1: Set a current temperature T to an initial temperature $T_0$, and set an iteration factor i to 0.

Operation 2: Initialize a population, and randomly generate each gene in the chromosome, where a random range is $[0, w_l]$, and $w_l$ is a time length of a send window.

Operation 3: For each individual (chromosome) in the population, calculate a fitness value fitness corresponding to the individual according to an equation (12) and the constraints (1) to (9).

Operation 4: If the current temperature T is higher than a termination temperature $T_{final}$, perform operation 5; otherwise, jump to operation 11.

Operation 5: If i is less than Iter (Iter is a quantity of iteration times corresponding to each temperature), perform operation 6; otherwise, jump to operation 10.

Operation 6: Perform double point cross-over and bit-inversion mutation on each pair of chromosomes in the population successively, to obtain child chromosomes.

Operation 7: Calculate fitness of each pair of generated child chromosomes, where the fitness of one pair of child chromosomes is denoted as $f_{C_j}$, k=1,2.

Operation 8: If the fitness of the children $f_{C_j} > f_{P_j}$ ($f_{P_j}$ is fitness of parents), the children replace the parents and are added to the population; or if the fitness of the children $f_{C_j} \le f_{P_j}$, the children are accepted with a probability of $\exp((f_{C_j} - f_{P_j})/T)$, and the children replace the parents and are added to the population.

Operation 9: Set i=i+1, and jump to operation 5.

Operation 10: Set T=α*T, where T indicates a current temperature, α indicates a temperature cooling rate; and jump to operation 4.

Operation 11: Select a chromosome that has highest fitness from the population, and return values of all genes in the chromosome.

Dynamic bandwidth allocation is performed on the two types of flows:

In this embodiment of this application, flows are classified into a predictable flow and a common non-predictable flow, and bandwidths are allocated to the two types of flows by using a time division network access technology. Scheduling of data packet sending in the two types of flows respectively occupy two send time windows, and different windows have different widths (that is, time lengths). For a predictable flow, a time length $wl_{predict}$ of a send window is a product of a time for sending a data packet with a size of a maximum transmission unit (MTU) to a network by using a fastest link (whose bandwidth is $bw_{max}$) connecting a host and the network and a maximum quantity N of flows passing through a same switch:

$$wl_{predict} = \frac{MTU}{bw_{max}} * N \quad (14)$$

where the value N may be obtained by the monitoring module by querying the OpenFlow switch.

A ratio of a time length $wl_{normal}$ of the send window of the non-predictable flow to a time length $wl_{predict}$ of the send window of the predictable flow is equal to a ratio of total transmitted data volumes of the two types of flows in a previous scheduling period. The time length of the send window of the non-predictable flow may be calculated based on the ratio and the time length of the send window of the predictable flow:

$$wl_{normal} = \frac{T_{normal}}{T_{predict}} * wl_{predict} \quad (15)$$

where $T_{predict}$ is the total transmitted data volume of the predictable flow in the previous scheduling period, $T_{normal}$ is the total transmitted data volume of the non-predictable flow, and the two pieces of data are both obtained by the monitoring module through statistics collection.

Queuing Rule Module in the Host:

In the host, two interface queues (IFQ) are configured to respectively queue data packets in the predictable flow and the non-predictable flow (that is, a common flow).

Figure 5:
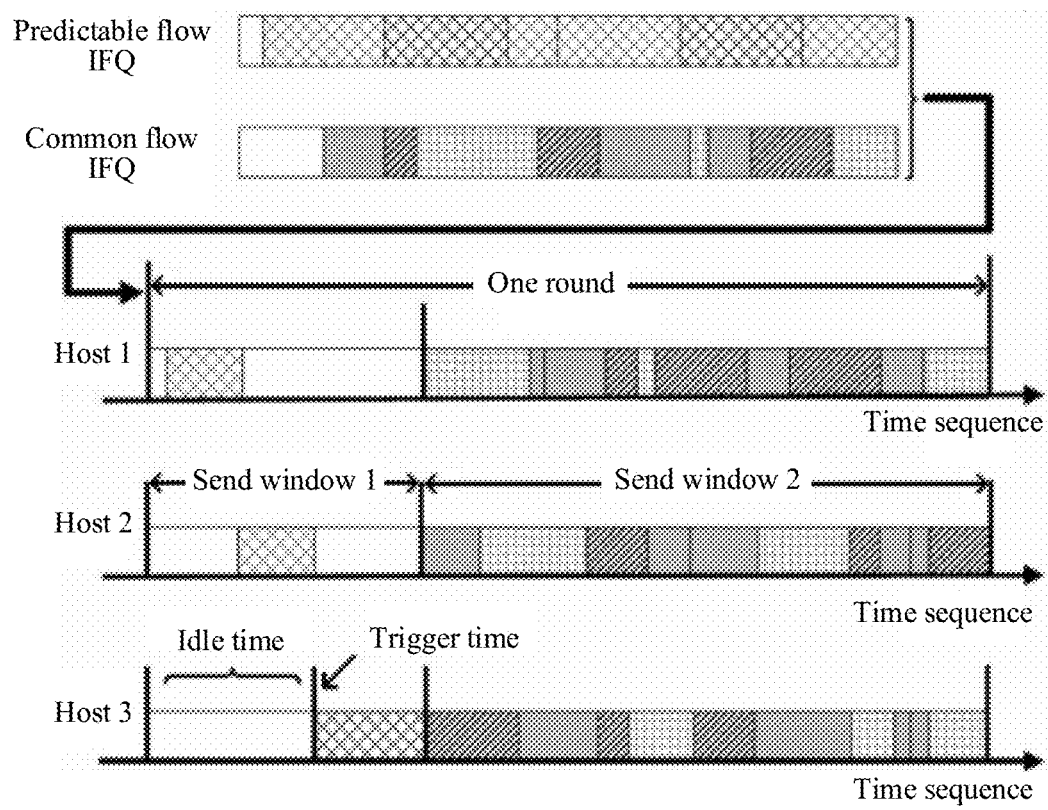
FIG. 5 is a schematic diagram of scheduling data packet sending by a host according to an embodiment of the present disclosure.

FIG. 5 shows an example of scheduling data packet sending in a period by a host. Scheduling of these data packets is periodic. Each period is referred to as a round. Each round is divided into two send time windows, which are respectively used to send data packets of the predictable flow (corresponding to a send window 1 in FIG. 5) and send data packets of the non-predictable flow (corresponding to a send window 2 in FIG. 5). A window length is set based on a calculation result of the scheduling module in the network controller.

Sending of a data packet in the predictable flow is based on a trigger time in the send window. The trigger time is a result obtained through calculation by using an optimal low-congestion transmission model. Therefore, in each round, only one data packet can be sent in the predictable flow. Different from the predictable flow, data packets of the non-predictable flow can all be sent by the host within a time range of the send window, so that data packets of a plurality of non-predictable flows may be sent within each round. In FIG. 5, different padding forms are used to distinguish between different data packets.

Figure 6:
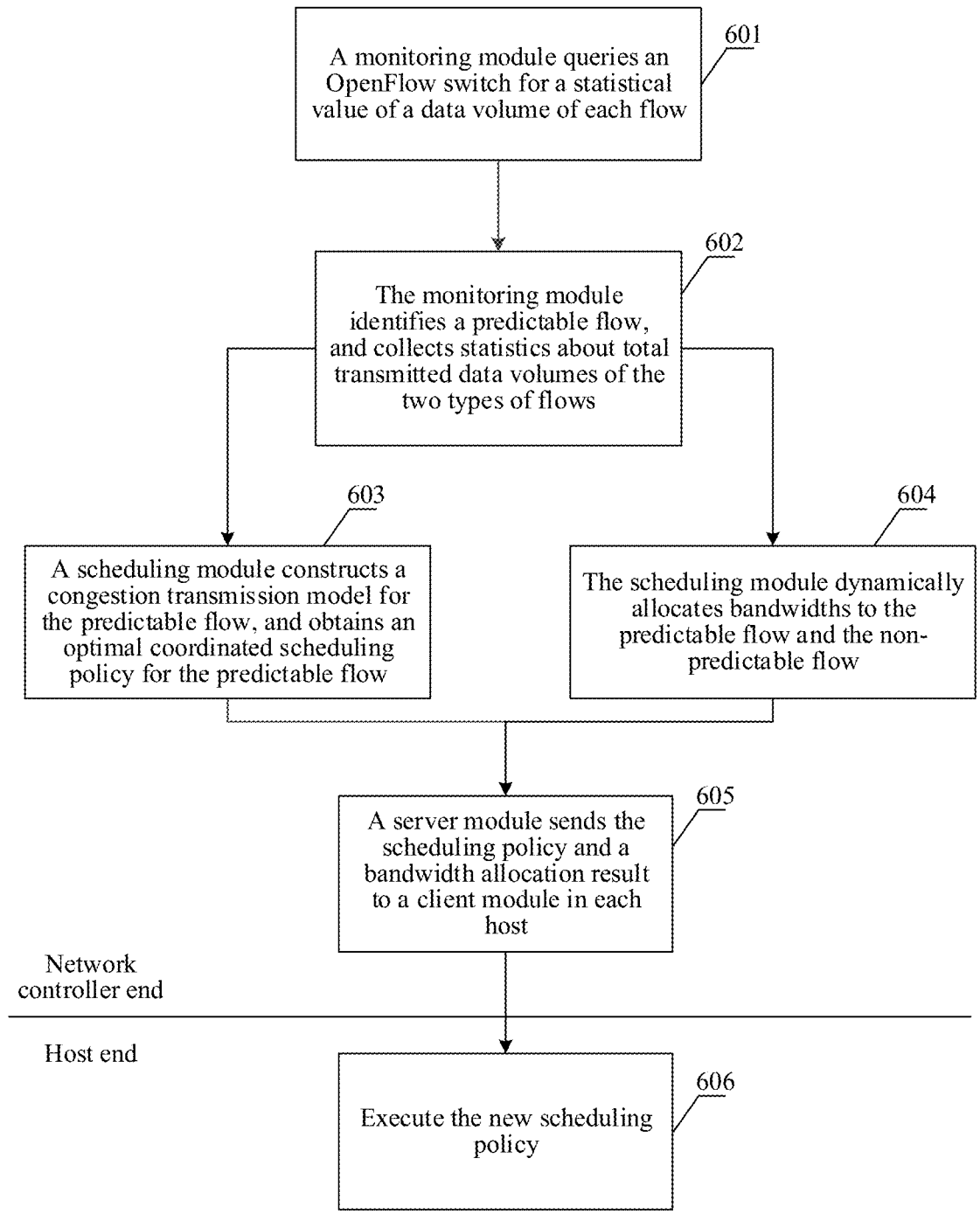
FIG. 6 is a working flowchart according to an embodiment of the present disclosure.

In conclusion, in this embodiment of this application, a periodic (for example, 500 milliseconds is a period) operation procedure of a network congestion avoidance mechanism is shown in FIG. 6. Operations are as follows:

601. A monitoring module in a network controller periodically (for example, every 0.1 seconds) queries the Open-Flow switch for a transmitted data volume of each flow, and collects statistics about the transmitted data volume of each flow.

602. The monitoring module calculates a traffic matrix based on a statistical result, identifies a predictable flow and a non-predictable flow in the traffic matrix, and collects statistics about total transmitted data volumes of the two types of flows within a time period.

603. A scheduling module constructs a congestion transmission model for the predictable flow, and solves the congestion transmission model by using a GASA algorithm, so as to obtain an optimal coordinated scheduling policy for the predictable flow.

604. The scheduling module dynamically allocates bandwidths to the predictable flow and the non-predictable flow.

605. The scheduling module sends the optimal scheduling policy and a bandwidth allocation result to a server module, and then the server module sends these results to a client module in each host kernel.

The foregoing operations are implemented at a network controller end.

606. A queuing rule module deploys the scheduling policy received by the client module into a kernel traffic control module, and strictly executes the new scheduling policy in a next period.

The foregoing operation is implemented at a host end.

This embodiment of the present disclosure mainly includes at least the following parts:

In an architecture of the solution in this embodiment of the present disclosure, an SDN architecture and the Open-Flow protocol are used, the network controller includes the monitoring module, the scheduling module, and the server module, and the host includes the client module and the queuing rule (traffic control) module.

The monitoring module periodically queries a switch for a status of a data volume transmitted in each flow, generates a traffic matrix, then identifies a predictable flow in the traffic matrix based on the traffic matrix, then respectively collects statistics about total transmitted data volumes of the predictable flow and a non-predictable flow, and sends a result to the scheduling module.

The scheduling module constructs a congestion transmission model for the predictable flow, solves the model by using hybrid genetic algorithm and simulated annealing, to obtain a globally optimal coordinated scheduling policy for the predictable flow, and formulates a bandwidth allocation scheme for the predictable flow and the non-predictable flow.

Congestion transmission model: An optimization objective is to minimize a transmission delay of a data packet in a network, where constraint factors include a byte length of the data packet, a bandwidth of a link, a time length of a send window, a moment of arrival of each data packet at each switch on a path, a moment of starting sending from an egress port, and a moment of completing transmission at the egress port. The constraint relationship includes: A same switch port can be occupied by only one data packet at a same time.

Bandwidth allocation policy for the two types of flows: Data packet sending of the two types of flows is corresponding to two send windows in each period; a length of a transmit time window of the predictable flow is a product of a time for sending a data packet with a size of an MTU to the network by using a fastest link connecting the host and the network and a maximum quantity of flows passing through a same switch; and a length of a send time window of the non-predictable flow is: A value obtained after ratio of total transmitted data volumes of the two types of flows in a previous scheduling period is multiplied by the time length of the send window of the predictable flow.

The queuing rule module in the host periodically schedules data packet sending, and data packets in the two types of flows are sent in two send windows. Sending of a data packet in the predictable flow is based on a trigger time in the send window. The trigger time is a result obtained through calculation by using the congestion transmission model. Therefore, only one data packet can be sent in the predictable flow within one period. Different from the predictable flow, data packets of the non-predictable flow can all be sent by the host within a time range of the send window, so that data packets of a plurality of non-predictable flows may be sent within each period.

This embodiment of this application has at least the following beneficial effects:

Active mechanism: Because network congestion is mainly caused by a throughput-intensive flow, a scheduling arrangement for congestion avoidance can be made in advance based on predictability of a throughput-intensive flow, instead of passively responding according to a corresponding congestion signal.

Extensibility: A scheduling arrangement is periodically formulated based on predictability of a throughput-intensive flow, and there is no need to make a new arrangement each time a data packet is sent; and this may be used in a large data center.

Congestion transmission model: By using a global field of view of a controller, a transmission delay of a data packet of a predictable throughput-intensive flow in a network is minimized, so as to coordinate transmission of data packets of throughput-intensive flows, thereby alleviating contention of these flows for network resources, and avoiding a packet loss caused by an excessively long cache queue or buffer overflow of a switch, thereby improving a throughput, reducing a transmission delay of a delay-sensitive flow.

Dynamic bandwidth allocation for different types of flows: In a manner similar to TDMA, different bandwidths are allocated based on volumes of data transmitted within a past period of time in a predictable flow and anon-predictable flow, so that the bandwidths are properly used.

In the example in the foregoing embodiment, that the network controller actively sends a query request to the switch is used as an implementation. This application document needs to state the following: In a process of identifying a predictable flow, the network controller periodically queries the OpenFlow switch for traffic transmitted in each flow within a specified time (that is, a volume of data transmitted within a specified time), so as to identify the predictable flow. This is used as an example, and should not be construed as a unique solution for obtaining traffic transmitted in each flow within a time. Another available method includes: A host collects statistics about traffic of each flow that is sent in a period of time, and sends a statistical result to a network controller; or to reduce a network bandwidth occupied by transmission results, all hosts send statistical results to a host (for example, one host is selected from each rack), and then the host sorts the results, and sends a result obtained after sorting to the network controller.

In addition, to solve the congestion transmission model, in the foregoing embodiment, hybrid genetic algorithm and simulated annealing (GASA) is used; or another heuristic algorithm, for example, an artificial neural network, a tabu algorithm, or an ant colony optimization algorithm may be used; or another approximation algorithm may be used. A solving algorithm is not uniquely limited in this embodiment of the present disclosure.

Figure 7:
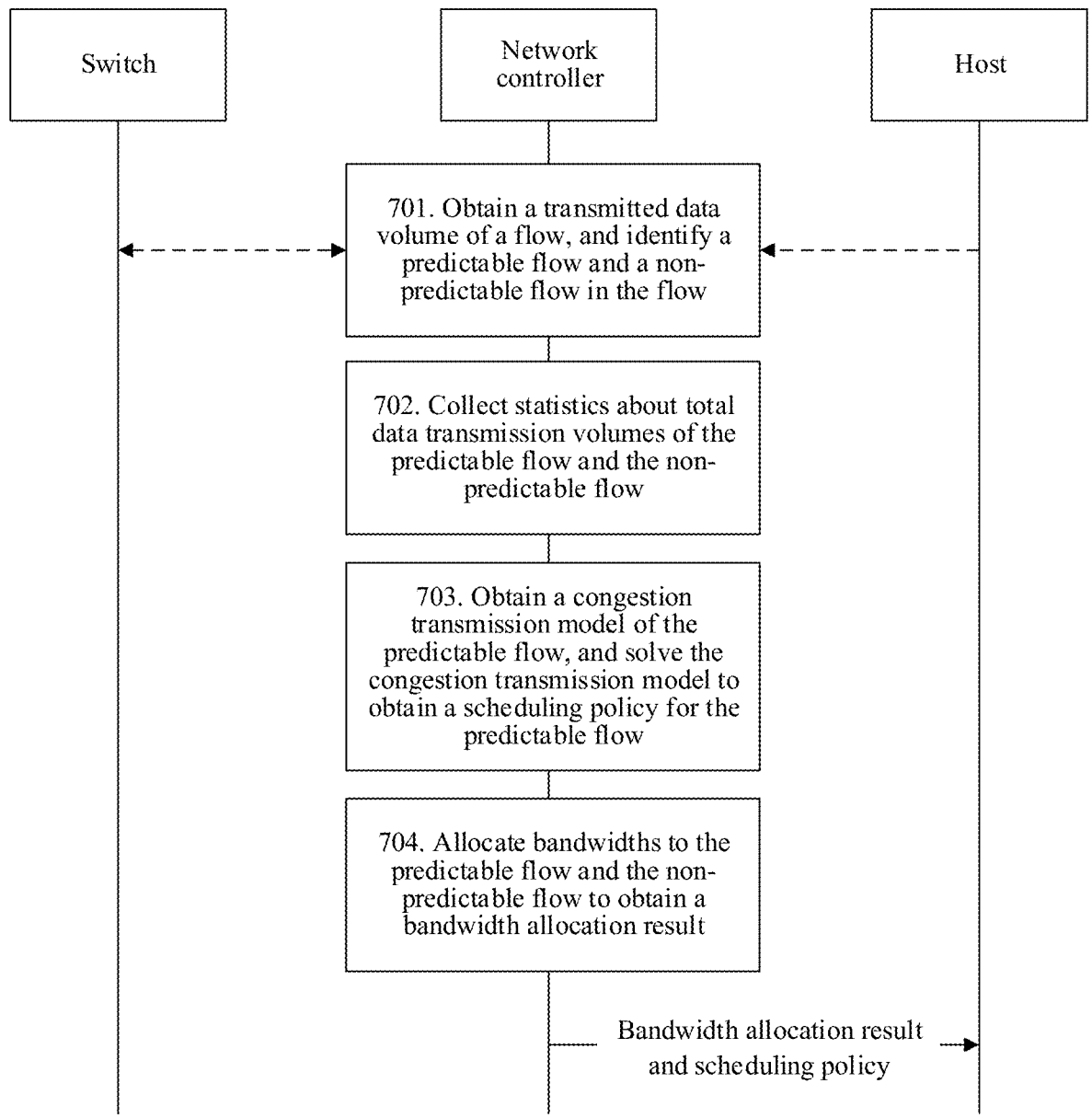
FIG. 7 is a schematic flowchart of a method according to an embodiment of the present disclosure.

Based on the foregoing description, an embodiment of the present disclosure provides a method for handling network congestion, applied to a system including a host and a switch. The system may further include a switch. The switch may be the OpenFlow switch shown in FIG. 1. This embodiment may be executed by a network controller, as shown in FIG. 7. Refer to FIG. 1 to FIG. 6 and the corresponding description. The method includes:

701. Obtain a transmitted data volume of a flow, and identify a predictable flow and a non-predictable flow in the flow.

702. Collect statistics about total data transmission volumes of the predictable flow and the non-predictable flow.

703. Obtain a congestion transmission model of the predictable flow, and solve the congestion transmission model to obtain a scheduling policy for the predictable flow.

704. Allocate bandwidths to the predictable flow and the non-predictable flow to obtain a bandwidth allocation result, and send the bandwidth allocation result and the scheduling policy to the host, so that the host executes the scheduling policy in a scheduling period.

In this embodiment, the flow may be an open flow, and the open flow is classified into two types in this embodiment: a predictable flow and a non-predictable flow. The predictable flow may be defined as a flow with a predictable data transmission volume within a time period, and other flows are considered as non-predictable flows. The congestion transmission model may be obtained through dynamic calculation, and a solution is provided in a subsequent embodiment. The congestion transmission model may be constructed and solved by using a principle that a queue of a data packet in an entire network system is the shortest. In this embodiment, a bandwidth may be equivalently considered as duration for transmitting a data packet in a time window.

In one embodiment, three manners of obtaining a transmitted data volume of a flow are further provided, and the obtaining a transmitted data volume of a flow includes:

sending a query request to the switch to query a transmitted data volume of a flow forwarded by the switch within a period, and receiving and collecting statistics about a query result returned by the switch; or receiving a transmitted data volume that is sent by the host and that is of a flow sent through the host; or receiving a transmitted data volume that is of a flow and that is obtained through statistics collecting by a host used as a serving host, where the flow includes a flow sent through at least two hosts other than the serving host.

In this embodiment, the host used as the serving host may be a host selected from a host rack, so as to reduce a data transmission volume.

In one embodiment, the identifying a predictable flow and a non-predictable flow in the flow includes:

calculating a traffic matrix based on a statistical result of the transmitted data volume; and when determining that an error between a most recently transmitted data volume of a flow f in the traffic matrix and an average data volume of the flow f within a preset time period is less than a preset threshold, determining the flow f as a predictable flow; otherwise, determining the flow f as a non-predictable flow.

The foregoing flow f may be any flow in the foregoing flows whose transmitted data volumes have been obtained, or may be equivalently considered as any flow in the traffic matrix.

In one embodiment, a manner of obtaining the congestion transmission model of the predictable flow is further provided. In one embodiment, the obtaining a congestion transmission model of the predictable flow includes:

obtaining $D=f(\tau,k_{first})-a(\tau,k_{last})$, where $\tau$ is a data packet in the flow; $D_\tau$ is a sum of transmission delays of $\tau$ on all switches on a path; $k_{first}$ and $k_{last}$ are respectively the first switch and the last switch that $\tau$ passes through on the forwarding path; $a(\tau,k_{last})$ indicates a moment at which $\tau$ arrives at $k_{last}$ and $f(\tau,k_{first})$ indicates a moment at which $\tau$ completes transmission on $k_{first}$.

In one embodiment, the solving the congestion transmission model to obtain a scheduling policy for the predictable flow includes:

solving the congestion transmission model to obtain the scheduling policy for the predictable flow by using hybrid genetic algorithm and simulated annealing or a heuristic algorithm.

In one embodiment, when hybrid genetic algorithm and simulated annealing is used, a chromosome is encoded by using a value, a length of the chromosome is a quantity of data packets, and each gene in the chromosome is a moment at which each data packet starts to be sent from a host. A selection operator, a crossover operator, and a mutation operator are respectively roulette wheel selection, double point cross-over, and bit-inversion mutation.

In one embodiment, the allocating bandwidths to the predictable flow and the non-predictable flow includes:

allocating send time windows to the predictable flow and the non-predictable flow respectively, where different time windows use different time lengths.

In one embodiment, the send time window allocated to the predictable flow includes:

$$wl_{predict} = \frac{MTU}{bw_{max}} * N,$$

where $wl_{predict}$ is a time length of the send window of the predictable flow, $bw_{max}$ is a fastest link connecting the host and a network, MTU is a maximum transmission unit, and N is a value provided by the switch.

In one embodiment, the send time window allocated to the non-predictable flow includes:

$$wl_{normal} = \frac{T_{normal}}{T_{predict}} * wl_{predict},$$

where $wl_{normal}$ is a time length of the send window of the non-predictable flow, $wl_{predict}$ is a time length of the send window of the predictable flow, $T_{predict}$ is a total transmitted data volume of a predictable flow in a previous scheduling period, and $T_{normal}$ is a total transmitted data volume of the non-predictable flow.

For more descriptions of the foregoing embodiment, refer to the foregoing description, and details are not described herein again.

An embodiment of the present disclosure further provides a method for handling network congestion, applied to a host in a system including the host and a switch. The host may be a terminal host. Refer to FIG. 7 and the foregoing description of FIG. 1 to FIG. 6. The foregoing method includes:

receiving a bandwidth allocation result and a scheduling policy from a network controller, where the bandwidth allocation result includes information about a bandwidth occupied by each of a predictable flow and a non-predictable flow; and storing data packets of the predictable flow and the non-predictable flow respectively by using two queues, and sending the data packets in the two queues based on the scheduling policy and the allocation result.

For descriptions of the predictable flow and the non-predictable flow, refer to the foregoing descriptions, and details are not described herein again. The two queues store the data packets of the predictable flow and the non-predictable flow respectively, so that the data packets of the predictable flow and the non-predictable flow are conveniently sent in respective bandwidths.

In one embodiment, due to a characteristic of the predictable flow, a data packet of the predictable flow needs to be sent at a relatively specific moment in a scheduling policy. Therefore, it may be set that a data packet of only one predictable flow is sent in one scheduling period. In one embodiment, the information about the occupied bandwidth includes a time length of a send time window occupied in one scheduling period.

The sending the data packets in the two queues includes:

sending, in a scheduling period, a data packet in a queue in which one predictable flow is located, and sending, in a scheduling period, a data packet in a queue in which one or more non-predictable flows are located.

Figure 8:
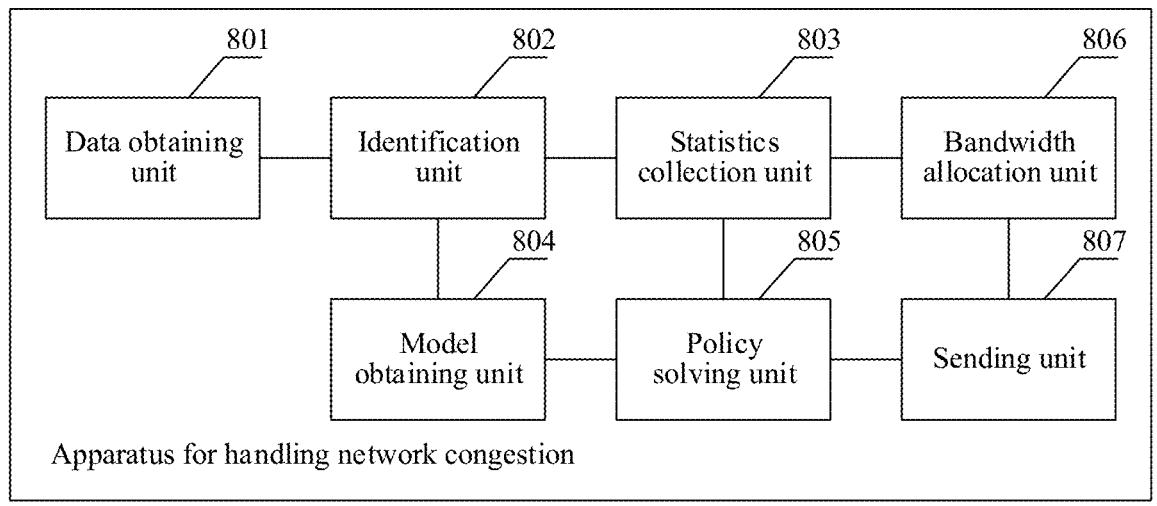
FIG. 8 is a schematic structural diagram of an apparatus according to an embodiment of the present disclosure.

An embodiment of the present disclosure further provides an apparatus for handling network congestion, applied to a system including a host and a switch. The apparatus for handling network congestion may be a network controller. As shown in FIG. 8, the apparatus includes:

a data obtaining unit 801, configured to obtain a transmitted data volume of a flow;

an identification unit 802, configured to identify a predictable flow and a non-predictable flow in the flow;

a statistics collecting unit 803, configured to collect statistics about total data transmission volumes of the predictable flow and the non-predictable flow;

a model obtaining unit 804, configured to obtain a congestion transmission model of the predictable flow;

a policy solving unit 805, configured to solve the congestion transmission model to obtain a scheduling policy for the predictable flow;

a bandwidth allocation unit 806, configured to allocate bandwidths to the predictable flow and the non-predictable flow to obtain a bandwidth allocation result; and a sending unit 807, configured to send the bandwidth allocation result and the scheduling policy to the host, so that the host executes the scheduling policy in a scheduling period.

In one embodiment, the data obtaining unit 801 is configured to: send a query request to the switch to query a transmitted data volume of a flow forwarded by the switch within a period, and receive and collect statistics about a query result returned by the switch; or configured to receive a transmitted data volume that is sent by the host and that is of a flow sent through the host; or configured to receive a transmitted data volume that is of a flow and that is obtained through statistics collecting by a host used as a serving host, where the flow includes a flow sent through at least two hosts other than the serving host.

In one embodiment, the identification unit 802 is configured to: calculate a traffic matrix based on a statistical result of the transmitted data volume; and when determining that an error between a most recently transmitted data volume of a flow f in the traffic matrix and an average data volume of the flow f within a preset time period is less than a preset threshold, determine the flow f as a predictable flow; otherwise, determine the flow f as a non-predictable flow.

In one embodiment, the model obtaining unit 804 is configured to obtain $D_\tau = f(\tau, k_{first}) - a(\tau, k_{last})$, where $\tau$ is a data packet in the flow; $D_\tau$ is a sum of transmission delays of $\tau$ on all switches on a path; $k_{first}$ and $k_{last}$ are respectively the first switch and the last switch that $\tau$ passes through on the forwarding path; $a(\tau, k_{last})$ indicates a moment at which $\tau$ arrives at $k_{last}$; and $f(\tau, k_{first})$ indicates a moment at which $\tau$ completes transmission on $k_{first}$.

In one embodiment, the policy solving unit 805 is configured to solve the congestion transmission model to obtain the scheduling policy for the predictable flow by using hybrid genetic algorithm and simulated annealing or a heuristic algorithm.

In one embodiment, the policy solving unit 805 is configured to: when hybrid genetic algorithm and simulated annealing is used, encode a chromosome by using a value, where a length of the chromosome is a quantity of data packets, each gene in the chromosome is a moment at which each data packet starts to be sent from a host, and a selection operator, a crossover operator, and a mutation operator are respectively roulette wheel selection, double point crossover, and bit-inversion mutation.

In one embodiment, the bandwidth allocation unit 806 is configured to allocate send time windows to the predictable flow and the non-predictable flow respectively, where different time windows use different time lengths.

In one embodiment, the send time window allocated by the bandwidth allocation unit 806 to the predictable flow includes:

$$wl_{predict} = \frac{MTU}{bw_{max}} * N,$$

where $wl_{predict}$ is a time length of the send window of the predictable flow, $bw_{max}$ is a fastest link connecting the host and a network, MTU is a maximum transmission unit, and N is a value provided by the switch.

In one embodiment, the send time window allocated by the bandwidth allocation unit 806 to the non-predictable flow includes:

$$wl_{normal} = \frac{T_{normal}}{T_{predict}} * wl_{predict},$$

where $wl_{normal}$ is a time length of the send window of the non-predictable flow, $wl_{predict}$ is a time length of the send window of the predictable flow, $T_{predict}$ is a total transmitted data volume of a predictable flow in a previous scheduling period, and $T_{normal}$ is a total transmitted data volume of the non-predictable flow.

Figure 9:
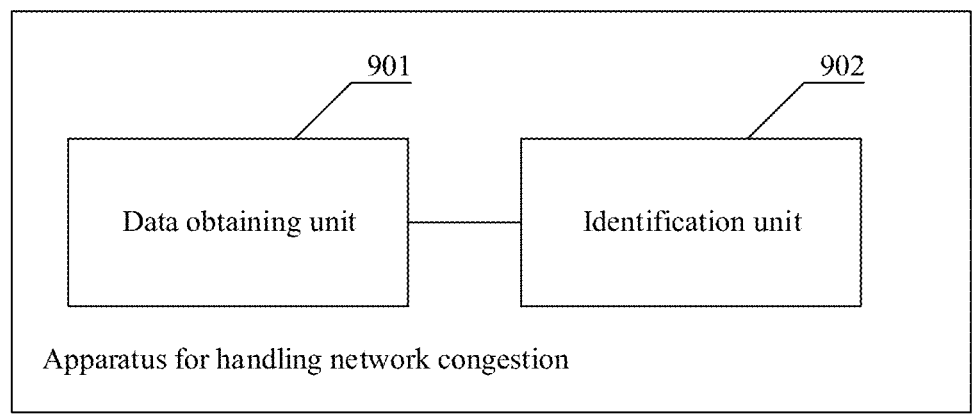
FIG. 9 is a schematic structural diagram of an apparatus according to an embodiment of the present disclosure.

An embodiment of the present disclosure further provides an apparatus for handling network congestion, applied to a host in a system including the host and a switch. As shown in FIG. 9, the apparatus includes:

a receiving unit 901, configured to receive a bandwidth allocation result and a scheduling policy from a network controller, where the bandwidth allocation result includes information about a bandwidth occupied by each of a predictable flow and a non-predictable flow; and an execution unit 902, configured to: store data packets of the predictable flow and the non-predictable flow respectively by using two queues, and send the data packets in the two queues based on the scheduling policy and the allocation result.

In one embodiment, the information about the occupied bandwidth includes a time length of a send time window occupied in one scheduling period.

That the execution unit 902 is configured to send the data packets in the two queues includes: The execution unit 902 is configured to send, in a scheduling period, a data packet in a queue in which one predictable flow is located, and send, in a scheduling period, a data packet in a queue in which one or more non-predictable flows are located.

Figure 10:
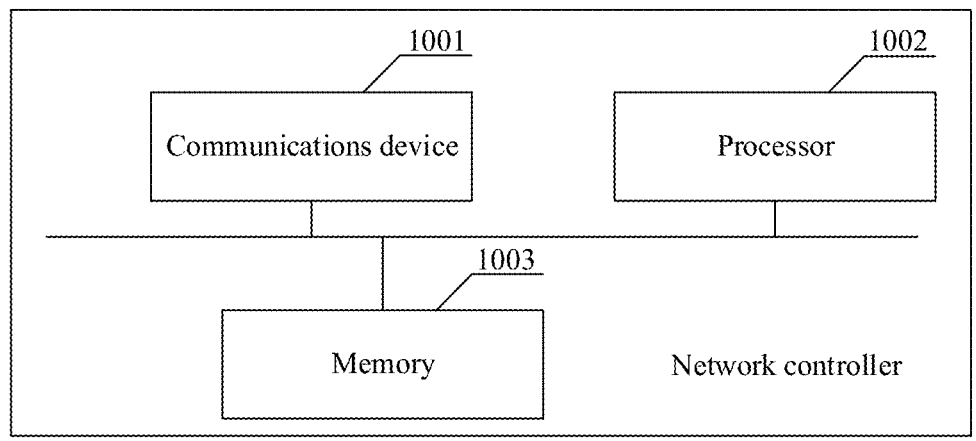
FIG. 10 is a schematic structural diagram of a network controller according to an embodiment of the present disclosure.

An embodiment of the present disclosure further provides a network controller. As shown in FIG. 10, the network controller includes a communications device 901, a processor 1002, and a memory 1003.

The memory 1003 includes but is not limited to a random access memory (RAM), a read-only memory (ROM), an erasable programmable read only memory (EPROM), or a compact disc read-only memory (CD-ROM). The memory 1003 is configured to store a related instruction and data. The communications device 1001 is configured to receive and transmit data.

The processor 1002 may be one or more central processing units (CPU). When the processor 1002 is one CPU, the CPU may be a single-core CPU or a multi-core CPU.

The communications device 1001 is configured to establish a communication connection to a host and a switch. The memory 1003 stores an executable instruction. The processor 1002 in the network controller is configured to read program code stored in the memory 1003, to perform any method performed by the network controller.

Functions of the communications device 1001 centralize communication functions of the monitoring module and the server module shown in FIG. 1.

Figure 11:
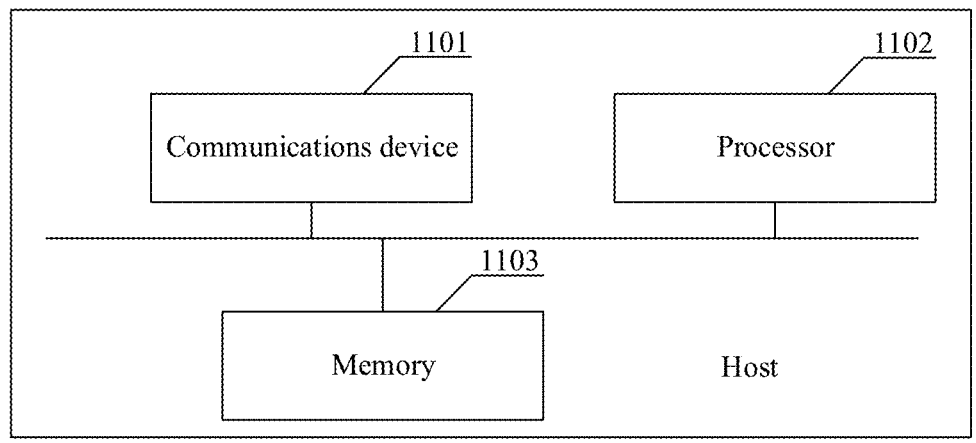
FIG. 11 is a schematic structural diagram of a host according to an embodiment of the present disclosure.

An embodiment of the present disclosure further provides a host. As shown in FIG. 11, the host includes a communications device 1101, a processor 1102, and a memory 1103.

The communications device 1101 is configured to establish a communication connection to a network controller and a switch. The memory 1103 stores an executable instruction. When the processor 1102 executes the foregoing executable instruction, the host in this embodiment of the present disclosure performs any method.

An embodiment of the present disclosure further provides a computer storage medium. The computer storage medium stores a computer program, and the computer program includes a program instruction. When the program instruction is executed by a processor, the processor is enabled to perform any method provided in the embodiments of the present disclosure.

An embodiment of the present disclosure further provides a network system, including: a network controller, a host, and a switch. Refer to the network structure shown in FIG. 1. The network controller is a device that has a function of a network controller in the embodiments of the present disclosure. The foregoing host is a device that has a function of the host provided in the embodiments of the present disclosure.

An embodiment of the present disclosure further provides another network system, including: a network controller, a host, and a switch. Refer to the network structure shown in FIG. 1. The network controller includes a monitoring module, a scheduling module, and a server module. The host includes a client, a queuing rule module, and a network interface card. The monitoring module and the switch establish a communication connection between the network controller and the switch, the server module and the client establish a communication connection between the network controller and the host, and the network interface card establishes a communication connection between the host and the switch.

The monitoring module is configured to: obtain a transmitted data volume of a flow, identify a predictable flow and a non-predictable flow in the flow, and collect statistics about total data transmission volumes of the predictable flow and the non-predictable flow.

The scheduling module is configured to: obtain a congestion transmission model of the predictable flow, solve the congestion transmission model to obtain a scheduling policy for the predictable flow, and allocate bandwidths to the predictable flow and the non-predictable flow, to obtain a bandwidth allocation result.

The server module is configured to send the bandwidth allocation result and the scheduling policy to the client.

The client is configured to send the bandwidth allocation result and the scheduling policy to the queuing rule module.

The queuing rule module is configured to store data packets of the predictable flow and the non-predictable flow respectively by using two queues.

The network interface card is configured to send the data packets in the two queues based on the scheduling policy and the allocation result.

In one embodiment, the information about the occupied bandwidth includes a time length of a send time window occupied in one scheduling period.

That the network interface card is configured to send the data packets in the two queues includes:

sending, in a scheduling period, a data packet in a queue in which one predictable flow is located, and sending, in a scheduling period, a data packet in a queue in which one or more non-predictable flows are located.

In one embodiment, the identifying a predictable flow and a non-predictable flow in the flow includes:

calculating a traffic matrix based on a statistical result of the transmitted data volume; and when determining that an error between a most recently transmitted data volume of a flow f in the traffic matrix and an average data volume of the flow f within a preset time period is less than a preset threshold, determining the flow f as a predictable flow; otherwise, determining the flow f as a non-predictable flow.

In one embodiment, that the monitoring module is configured to obtain a congestion transmission model of the predictable flow includes:

obtaining $D_\tau = f(\tau, k_{first}) - a(\tau, k_{last})$, where $\tau$ is a data packet in the flow; $D_\tau$ is a sum of transmission delays of $\tau$ on all switches on a path; $k_{first}$ and $k_{last}$ are respectively the first switch and the last switch that $\tau$ passes through on the forwarding path; $a(\tau, k_{last})$ indicates a moment at which $\tau$ arrives at $k_{last}$; and $f(\tau, k_{first})$ indicates a moment at which $\tau$ completes transmission on $k_{first}$.

In one embodiment, that the scheduling module is configured to solve the congestion transmission model to obtain a scheduling policy for the predictable flow includes:

solving the congestion transmission model to obtain the scheduling policy for the predictable flow by using hybrid genetic algorithm and simulated annealing or a heuristic algorithm.

In one embodiment, when hybrid genetic algorithm and simulated annealing is used, a chromosome is encoded by using a value, a length of the chromosome is a quantity of data packets, and each gene in the chromosome is a moment at which each data packet starts to be sent from a host. A selection operator, a crossover operator, and a mutation operator are respectively roulette wheel selection, double point cross-over, and bit-inversion mutation.

In one embodiment, that the scheduling module is configured to allocate bandwidths to the predictable flow and the non-predictable flow includes:

allocating send time windows to the predictable flow and the non-predictable flow respectively, where different time windows use different time lengths.

In one embodiment, the send time window allocated by the scheduling module to the predictable flow includes:

$$wl_{predict} = \frac{MTU}{bw_{max}} * N,$$

where $wl_{predict}$ is a time length of the send window of the predictable flow, $bw_{max}$ is a fastest link connecting the host and a network, MTU is a maximum transmission unit, and N is a value provided by the switch.

In one embodiment, the send time window allocated by the scheduling module to the non-predictable flow includes:

$$wl_{normal} = \frac{T_{normal}}{T_{predict}} * wl_{predict},$$

where $wl_{normal}$ is a time length of the send window of the non-predictable flow, $wl_{predict}$ is a time length of the send window of the predictable flow, $T_{predict}$ is a total transmitted data volume of a predictable flow in a previous scheduling period, and $T_{normal}$ is a total transmitted data volume of the non-predictable flow.

It can be learned from the foregoing technical solutions that the embodiments of the present disclosure have the following advantages: Based on predictability of some flows, for example, predictability of a throughput-intensive flow, flows are classified into a predictable flow and anon-predictable flow, and the two types of flows are separately scheduled; and the technical solutions of the present disclosure are an active congestion handling mechanism, can prevent congestion in advance and reduce a delay of a delay-sensitive flow, and are applicable to a large data center.

A person of ordinary skill in the art may understand that all or some of the processes of the methods in the embodiments may be implemented by a computer program instructing relevant hardware. The program may be stored in a computer-readable storage medium. When the program run, the processes of the methods in the embodiments are performed. The foregoing storage medium includes any medium that can store program code, such as a ROM or a random access memory (RAM), a magnetic disk or an optical disc.

What is claimed is:

1. A method for handling network congestion applied to a system comprising a host and a switch, the method comprising:

obtaining a transmitted data volume of a flow;

identifying a predictable flow and a non-predictable flow in the flow including calculating a traffic matrix based on a statistical result of the transmitted data volume, wherein when determining that an error between a most recently transmitted data volume of a flow f in the traffic matrix and an average data volume of the flow f within a preset time period is less than a preset threshold, determining the flow f as a predictable flow; or when the error is greater than or equal to the preset threshold, determining the flow f as a non-predictable flow;

collecting statistics about total data transmission volumes of the predictable flow and the non-predictable flow;

obtaining a congestion transmission model of the predictable flow, and solving the congestion transmission model to obtain a scheduling policy for the predictable flow; and allocating bandwidths to the predictable flow and the non-predictable flow to obtain a bandwidth allocation result, and sending the bandwidth allocation result and the scheduling policy to the host, so that the host executes the scheduling policy in a scheduling period.

2. The method according to claim 1, wherein the obtaining the transmitted data volume of a flow comprises:

sending a query request to the switch to query a transmitted data volume of a flow forwarded by the switch within a period, and receiving and collecting statistics about a query result returned by the switch; or receiving a transmitted data volume that is sent by the host and that is of a flow sent through the host; or receiving a transmitted data volume that is of a flow and that is obtained through statistics collected by a host used as a serving host, wherein the flow comprises a flow sent through at least two hosts other than the serving host.

3. The method according to claim 1, wherein the obtaining the congestion transmission model of the predictable flow comprises:
obtaining $D_\tau=f(\tau,k_{first})-a(\tau,k_{last})$, wherein $\tau$ is a data packet in the flow;
$D_\tau$ is a sum of transmission delays of $\tau$ on all switches on a path; $k_{first}$ and $k_{last}$ are respectively a first switch and a last switch that $\tau$ passes through on the forwarding path; $a(\tau,k_{last})$ indicates a moment at which $\tau$ arrives at $k_{last}$; and $f(\tau,k_{first})$ indicates a moment at which $\tau$ completes transmission on $k_{first}$.

4. The method according to claim 1, wherein the allocating bandwidths to the predictable flow and the non-predictable flow comprises:
allocating send time windows to the predictable flow and the non-predictable flow respectively, wherein different time windows use different time lengths.

5. The method according to claim 4, wherein the send time window allocated to the predictable flow comprises:

$$wl_{predict} = \frac{MTU}{bw_{max}} *N,$$

wherein $wl_{predict}$ is a time length of the send window of the predictable flow, $bw_{max}$ is a fastest link connecting the host and a network, MTU is a maximum transmission unit, and N is a value provided by the switch.

6. The method according to claim 4, wherein the send time window allocated to the non-predictable flow comprises:

$$wl_{normal} = \frac{T_{normal}}{T_{predict}} *wl_{predict},$$

$wl_{normal}$ is a time length of the send window of the non-predictable flow, $wl_{predict}$ is a time length of the send window of the predictable flow, $T_{predict}$ is a total transmitted data volume of a predictable flow in a previous scheduling period, and $T_{normal}$ is a total transmitted data volume of the non-predictable flow.

7. An apparatus for handling network congestion applied to a system comprising a host and a switch, the apparatus comprising:
a processor configured to:
obtain a transmitted data volume of a flow;
identify a predictable flow and a non-predictable flow in the flow including calculating a traffic matrix based on a statistical result of the transmitted data volume, wherein when determining that an error between a most recently transmitted data volume of a flow f in the traffic matrix and an average data volume of the flow f within a preset time period is less than a preset threshold, determine the flow f as a predictable flow; or when the error is greater than or equal to the preset threshold, determine the flow f as a non-predictable flow;
collect statistics about total data transmission volumes of the predictable flow and the non-predictable flow;
obtain a congestion transmission model of the predictable flow;
solve the congestion transmission model to obtain a scheduling policy for the predictable flow;
allocate bandwidths to the predictable flow and the non-predictable flow to obtain a bandwidth allocation result; and
a transceiver configured to send the bandwidth allocation result and the scheduling policy to the host such that the host executes the scheduling policy in a scheduling period.

8. The apparatus according to claim 7, wherein the processor is configured to:
send, via the transceiver, a query request to the switch to query a transmitted data volume of a flow forwarded by the switch within a period, and receive and collect statistics about a query result returned by the switch; or
receive, via the transceiver, a transmitted data volume that is sent by the host and that is of a flow sent through the host; or
receive, via the transceiver, a transmitted data volume that is of a flow and that is obtained through statistics collected by a host used as a serving host, wherein the flow comprises a flow sent through at least two hosts other than the serving host.

9. The apparatus according to claim 7, wherein
the processor is configured to obtain $D_\tau=f(\tau,k_{first})-a(\tau,k_{last})$, wherein $\tau$ is a data packet in the flow; $D_\tau$ is a sum of transmission delays of $\tau$ on all switches on a path; $k^{first}$ and $k^{last}$ are respectively a first switch and a last switch that $\tau$ passes through on the forwarding path; and $a(\tau,k_{last})$ indicates a moment at which $\tau$ arrives at $k_{last}$ and $f(\tau,k_{first})$ indicates a moment at which T completes transmission on $k_{first}$.

10. The apparatus according to claim 7, wherein
the processor is configured to allocate send time windows to the predictable flow and the non-predictable flow respectively, wherein different time windows use different time lengths.

11. The apparatus according to claim 10, wherein the send time window allocated to the predictable flow comprises:

$$wl_{predict} = \frac{MTU}{bw_{max}} *N,$$

$Wl_{predict}$ is a time length of the send window of the predictable flow, $bw_{max}$ is a fastest link connecting the host and a network, MTU is a maximum transmission unit, and N is a value provided by the switch.

12. The apparatus according to claim 10, wherein the send time window allocated to the non-predictable flow comprises:

$$wl_{normal} = \frac{T_{normal}}{T_{predict}} *wl_{predict},$$

$Wl_{normal}$ is a time length of the send window of the non-predictable flow, $wl_{predict}$ is a time length of the send window of the predictable flow, $T_{predict}$ is a total transmitted data volume of a predictable flow in a previous scheduling period, and $T_{normal}$ is a total transmitted data volume of the non-predictable flow.

13. A network system comprising:
a network controller configured to:
obtain a transmitted data volume of a flow;
identify a predictable flow and a non-predictable flow in the flow including calculating a traffic matrix based on a statistical result of the transmitted data volume, wherein when determining that an error between a most recently transmitted data volume of a flow f in the traffic matrix and an average data volume of the flow f within a preset time period is less than a preset threshold, determine the flow f as a predictable flow; or when the error is greater than or equal to the preset threshold, determine the flow f as a non-predictable flow;

collect statistics about total data transmission volumes of the predictable flow and the non-predictable flow;

obtain a congestion transmission model of the predictable flow;

solve the congestion transmission model to obtain a scheduling policy for the predictable flow;

allocate bandwidths to the predictable flow and the non-predictable flow to obtain a bandwidth allocation result; and send the bandwidth allocation result and the scheduling policy; and a host configured to:
receive the bandwidth allocation result and the scheduling policy from the network controller, store data packets of the predictable flow and the non-predictable flow respectively by using two queues, and send the data packets in the two queues based on the scheduling policy and the allocation result.

* * * * *